(12) United States Patent
Nitta

(10) Patent No.: US 11,808,227 B2
(45) Date of Patent: Nov. 7, 2023

(54) CONTROL UNIT FOR INTERNAL COMBUSTION ENGINE SYSTEM

(71) Applicant: KABUSHIKI KAISHA TOYOTA JIDOSHOKKI, Kariya (JP)

(72) Inventor: Kazuhiro Nitta, Kariya (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 0 days.

(21) Appl. No.: 17/991,273

(22) Filed: Nov. 21, 2022

(65) Prior Publication Data

US 2023/0160352 A1    May 25, 2023

(30) Foreign Application Priority Data

Nov. 24, 2021   (JP) .................................. 2021-190079

(51) Int. Cl.
| | |
|---|---|
| *F02D 41/00* | (2006.01) |
| *F02D 41/04* | (2006.01) |
| *F02D 41/14* | (2006.01) |

(52) U.S. Cl.
CPC ........ *F02D 41/1454* (2013.01); *F02D 41/0007* (2013.01); *F02D 41/0072* (2013.01); *F02D 41/042* (2013.01); *F02D 2200/0802* (2013.01)

(58) Field of Classification Search
CPC .............. F02D 41/0007; F02D 41/0072; F02D 41/042; F02D 41/1454; F02D 41/1446; F02D 41/029; F02D 41/0235; F02D 41/0077; F02D 41/0275; F02D 41/024; F02D 2200/0802; F02M 26/05; F02M 26/06; F02M 26/04; F02M 26/14; F02M 26/16; F02M 35/10222; F01N 3/023; F01N 3/20; F01N 9/00; F01N 2560/025; Y02T 10/12; Y02T 10/40

See application file for complete search history.

(56) References Cited

U.S. PATENT DOCUMENTS

| | | | |
|---|---|---|---|
| 10,907,558 B2* | 2/2021 | Ulrey et al. ........... | F02D 41/26 |
| 11,215,129 B2* | 1/2022 | Kiwan et al. ........ | F02D 41/123 |
| 2011/0072792 A1 | 3/2011 | Bidner et al. | |
| 2012/0227382 A1 | 9/2012 | Bidner et al. | |
| 2020/0224614 A1* | 7/2020 | Hu et al. ................. | F02B 37/10 |

FOREIGN PATENT DOCUMENTS

| | | |
|---|---|---|
| JP | 2006-104966 A | 4/2006 |
| JP | 2019-052579 A | 4/2019 |

* cited by examiner

*Primary Examiner* — Audrey B. Walter
*Assistant Examiner* — Dapinder Singh
(74) *Attorney, Agent, or Firm* — Sughrue Mion, PLLC

(57) ABSTRACT

A control unit configured to control an electric turbocharger and an EGR valve. While an internal combustion engine is stopped, an oxygen-free period, which is a period during which oxygen surrounding an exhaust gas purifier used for an oxidation reaction runs out, is estimated based on a temperature of the exhaust gas purifier. Before entering the oxygen-free period, the EGR valve is opened and the electric turbocharger is driven. Air surrounding the exhaust gas purifier is replaced with fresh air. After replacement with the fresh air has been completed, the electric turbocharger is stopped.

17 Claims, 7 Drawing Sheets

[Adjusting Load of Internal Combustion Engine]

[Detecting Stop of Operating Internal Combustion Engine]

CONTROL UNIT FOR INTERNAL COMBUSTION ENGINE SYSTEM

CROSS-REFERENCE TO RELATED APPLICATIONS

This application claims priority to Japanese patent application serial number 2021-190079, filed Nov. 24, 2021, the contents of which is incorporated herein by reference in its entirety for all purposes.

BACKGROUND

The present disclosure relates to control units for internal combustion engine systems. For example, the present disclosure relates to a control unit for preventing deterioration of an exhaust gas purifier of an internal combustion engine.

Exhaust gases from internal combustion engines contain hydrocarbons (HC), carbon monoxide (CO), nitrogen oxides (NOx), particulate matter (PM), etc. Vehicles equipped with an internal combustion engine may be equipped with various exhaust gas purifiers for purifying exhaust gases. Some vehicles are equipped with a diesel engine as an internal combustion engine. Such vehicles may be equipped, for example, with a first oxidation catalyst, a particle trap filter (DPF), an urea selective catalytic reducer (SCR), a second oxidation catalyst, and/or the like from an upstream side to a downstream side of exhaustion. In addition, a three-way catalyst, an NSR (NOx Storage-Reduction catalyst), and/or the like may be used as an exhaust gas purifier.

Hydrocarbons (HC) are often converted to water ($H_2O$) and carbon dioxide ($CO_2$). For example, a first oxidation catalyst with an oxidation function, a particle trap filter, a three-way catalyst, and an NSR may serve to purify hydrocarbons from the exhaust gas using an oxidation reaction. Carbon monoxide (CO) is often converted to carbon dioxide ($CO_2$). For example, the first oxidation catalyst with the oxidation function, the particle trap filter, the three-way catalyst, and the NSR serve to purify carbon monoxide from the exhaust gas using an oxidation reaction. Nitrogen oxides (NOx) are often converted to nitrogen ($N_2$). For example, nitrogen oxides are purified from the exhaust gas by a reduction reaction between ammonia generated from added urea water, and an urea SCR using a reduction function, or by a reduction reaction by an NSR using a reduction function. If excess ammonia is generated, a second oxidation catalyst purifies nitrogen oxides using an oxidation reaction. Particulate matter (PM) is trapped by the particle trap filter and is not released into the atmosphere.

The exhaust gas purifier purifies hydrocarbons (HC) through an oxidation reaction. In this case, the exhaust gas purifier adsorbs the hydrocarbons (HC). The adsorbed hydrocarbons (HC) are subjected to an oxidation reaction with the oxygen surrounding the exhaust gas purifier. A shortage of oxygen will not typically occur since fresh exhaust gas containing oxygen continuously flows through the exhaust gas purifier while an internal combustion engine is in operation. On the other hand, if the operation of the internal combustion engine stops, the fresh exhaust gas will no longer flow through the exhaust gas purifier. In this case, the surrounding oxygen supply may run out. If the surrounding oxygen runs out when the temperature of the exhaust gas purifier is higher than or equal to an activation temperature, the oxidation reaction will stop proceeding. As a result, hydrogen (H) is desorbed from the adsorbed hydrocarbons (HC). Carbon (C) thus accumulates as a deposit (so-called coking occurs (adhered by polymerization reaction)), which may lead to the deterioration of the exhaust gas purifier. In order to prevent coking from occurring after the stopping operation of the internal combustion engine, it is necessary to lower the temperature of the exhaust gas purifier or to ensure that the oxygen surrounding the exhaust gas purifier does not run out.

A first conventional system for an exhaust gas purifier for an internal combustion engine may shift the air/fuel ratio of the exhaust gas from the operating internal combustion engine from a lean state to a stoichiometric state or rich state. In this case, air or water is used from outside to lower the temperature of the exhaust gas. This lowers the temperature of the exhaust gas purifier and prevents deterioration in NOx purification performance.

A second conventional system for an exhaust gas purifier for an engine increases an amount of ammonia adsorption by an SCR after the engine has stopped. This ammonia absorption amount is increased to an amount greater than or equal to a standard amount to ensure sufficient NOx purification performance when the engine is subsequently started. More specifically, an EGR passage is opened while driving an electric turbocharger after the engine has stopped so as to feed fresh air to the SCR. Urea is then supplied after the SCR temperature has lowered.

The first conventional exhaust gas purifier for an internal combustion engine is not configured to prevent an occurrence of coking after the internal combustion engine has stopped. The temperature within an exhaust pipe and the temperature of the exhaust gas purifier are lowered using water while the internal combustion engine is in operation. In this case, water drops come directly in contact with the exhaust gas purifier, which may lead to a damage of the exhaust gas purifier. Further, it is necessary to add, for example, a tank for storing water or a water injection apparatus. This makes the system more complex and requires more space for mounting.

The second conventional exhaust gas purifier serves to lower the temperature of the SCR after the internal combustion engine has stopped so as to increase an adsorbed ammonia amount. In other words, this apparatus is not intended to allow the hydrocarbons to undergo an oxidation reaction, which would prevent the occurrence of coking after the internal combustion engine has stopped. With this exhaust gas purifier, fresh air is blown using an electric turbocharger and an EGR pipe after the internal combustion engine has stopped. Therefore, in order to lower the temperature of the SCR, an electric turbocharger needs to be operated continuously for a relatively long time. As a result, power consumption will increase.

Accordingly, there has conventionally been a need for an exhaust gas purifier having a function to purify specific components in exhaust gas by oxidation reaction. For example, there has conventionally been a need for a structure to appropriately prevent the occurrence of coking so as to prevent deterioration of the exhaust gas purifier while minimizing the amount of power consumption.

SUMMARY

One aspect of the present disclosure relates to a control unit for an internal combustion engine system. The internal combustion engine system includes an internal combustion engine. An intake pipe is connected to the internal combustion engine. An electric turbocharger used to supercharge an intake air to the internal combustion engine is provided at the intake pipe. An exhaust pipe is connected to the internal combustion engine. An EGR pipe is configured to return a portion of exhaust gas flowing through the exhaust pipe to the intake pipe on an outlet side of the electric turbocharger. An EGR valve adjusts an opening degree of the EGR pipe. An exhaust gas purifier is provided at the exhaust pipe on a side downstream of a connection between the EGR pipe and the exhaust pipe. The exhaust gas purifier adsorbs specific components contained in the exhaust gas. The adsorbed specific components are subjected to an oxidation reaction using surrounding oxygen so as to purify the specific components from the exhaust gas. The control unit detects operation states of the internal combustion engine to control an actuator including the electric turbocharger and the EGR valve. An exhaust gas purifier temperature acquiring section of the control unit serves to acquire the temperature of the exhaust gas purifier. An operation stop detecting section detects that the internal combustion engine in operation has stopped. When the operation stop detecting section detects that the internal combustion engine in operation has stopped, a deterioration prevention controlling part is implemented. The exhaust gas purifier temperature acquiring section acquires the temperature of the exhaust gas purifier while the internal combustion engine is stopped. An oxygen-free period estimating section of the deterioration prevention controlling part estimates an oxygen-free period based on the temperature of the exhaust gas purifier. The oxygen-free period is a period during which the oxygen surrounding the exhaust gas purifier used for the oxidation reaction of the specific components is expected to run out. A fresh air replacement controlling section of the deterioration prevention controlling part allows the EGR valve to open before entering the estimated oxygen-free period and drives the electric turbocharger to replace the air surrounding the exhaust gas purifier with fresh air. After the replacement has been completed, the electric turbocharger is stopped from running.

Therefore, the oxidation reaction continues to prevent the occurrence of coking. Further, since the electric turbocharger is stopped after the replacement with fresh air has been completed, the power consumption amount can be reduced.

According to another aspect of the present disclosure, the control unit acquires an oxidation reaction rate of the exhaust gas purifier based on the acquired temperature of the exhaust gas purifier that was acquired at an exhaust gas purifier temperature acquiring section when estimating the oxygen-free period at the oxygen-free period estimating section. The control unit estimates the oxygen-free period based on the acquired oxidation reaction rate. Therefore, a more accurate oxygen-free period can be estimated. This allows the power consumption amount of the electric turbocharger to be reduced more appropriately.

According to another aspect of the present disclosure, an operation stop detecting section serves to detect whether the internal combustion engine in operation has stopped. While the oxidation reaction in the exhaust gas purifier continues when the internal combustion engine is stopped, the fresh air replacement controlling section replaces the fresh air. The oxygen-free period estimating section estimates a new oxygen-free period after the fresh air has been replaced. The replacement of the fresh air and the estimation of the oxygen-free period can be repeated.

The surrounding oxygen may eventually run out after just a single fresh air replacement. Even in such a case, the replacement of the fresh air and the oxygen-free period can be repeated. This prevents the surrounding oxygen from running out.

According to another aspect of the present disclosure, one of the specific components may be hydrocarbons. An adsorbed hydrocarbon amount acquiring section of the control unit estimates an adsorbed hydrocarbon amount. The adsorbed hydrocarbon amount is an amount of hydrocarbons adsorbed to the exhaust gas purifier while the internal combustion engine was in operation and/or once it has stopped. An operation stop detecting section detects that the operating internal combustion engine has stopped. The oxygen-free period estimating section estimates an oxygen-free period. At this time, the control unit estimates the oxygen-free period based on the temperature of the exhaust gas purifier and the adsorbed hydrocarbon amount.

This allows for a more accurate estimation of the oxygen-free period. The power consumption amount of the electric turbocharger can then be reduced more appropriately.

According to one aspect of the present disclosure, the operation stop detecting section detects that the operating internal combustion engine has stopped. A fresh air replacement controlling section replaces the fresh air. In this case, the control unit ends the implementation of the deterioration prevention controlling part if the control unit determined that the hydrocarbons, based on the adsorbed hydrocarbon amount, have been sufficiently eliminated due to the oxidation reaction. Therefore, the deterioration prevention controlling part can be ended at an appropriate timing. As a result, unnecessary power consumption can be properly avoided.

According to another aspect of the present disclosure, the operation stop detecting section detects that the operating internal combustion engine has stopped. The fresh air replacement controlling section replaces the fresh air. In this case, the control unit ends the implementation of the deterioration prevention controlling part if the temperature of the exhaust gas purifier, as acquired at the exhaust gas purifier temperature acquiring section, becomes lower than or equal to an end determining temperature. Therefore, the deterioration prevention controlling part can be ended at an appropriate timing. As a result, unnecessary power consumption can be avoided more appropriately.

According to another aspect of the present disclosure, a load adjusting section of the control unit can adjust the load to the internal combustion engine. Before the operating internal combustion engine has stopped, the load adjusting section adjusts the load existing immediately before the internal combustion engine stops so as to stop the internal combustion engine such that the crank angle is within the range where both the intake and exhaust valves of at least one of cylinders of the internal combustion engine are open.

Therefore, in addition to the EGR pipe, any of the cylinders with both the intake and exhaust valves open may also be used as fresh air passages when the electric turbocharger is driven to replace the fresh air surrounding the exhaust gas purifier. Thus, a pressure loss when blowing the fresh air can be reduced. As a result, the fresh air can be replaced more efficiently.

DETAILED DESCRIPTION

Figure 1:
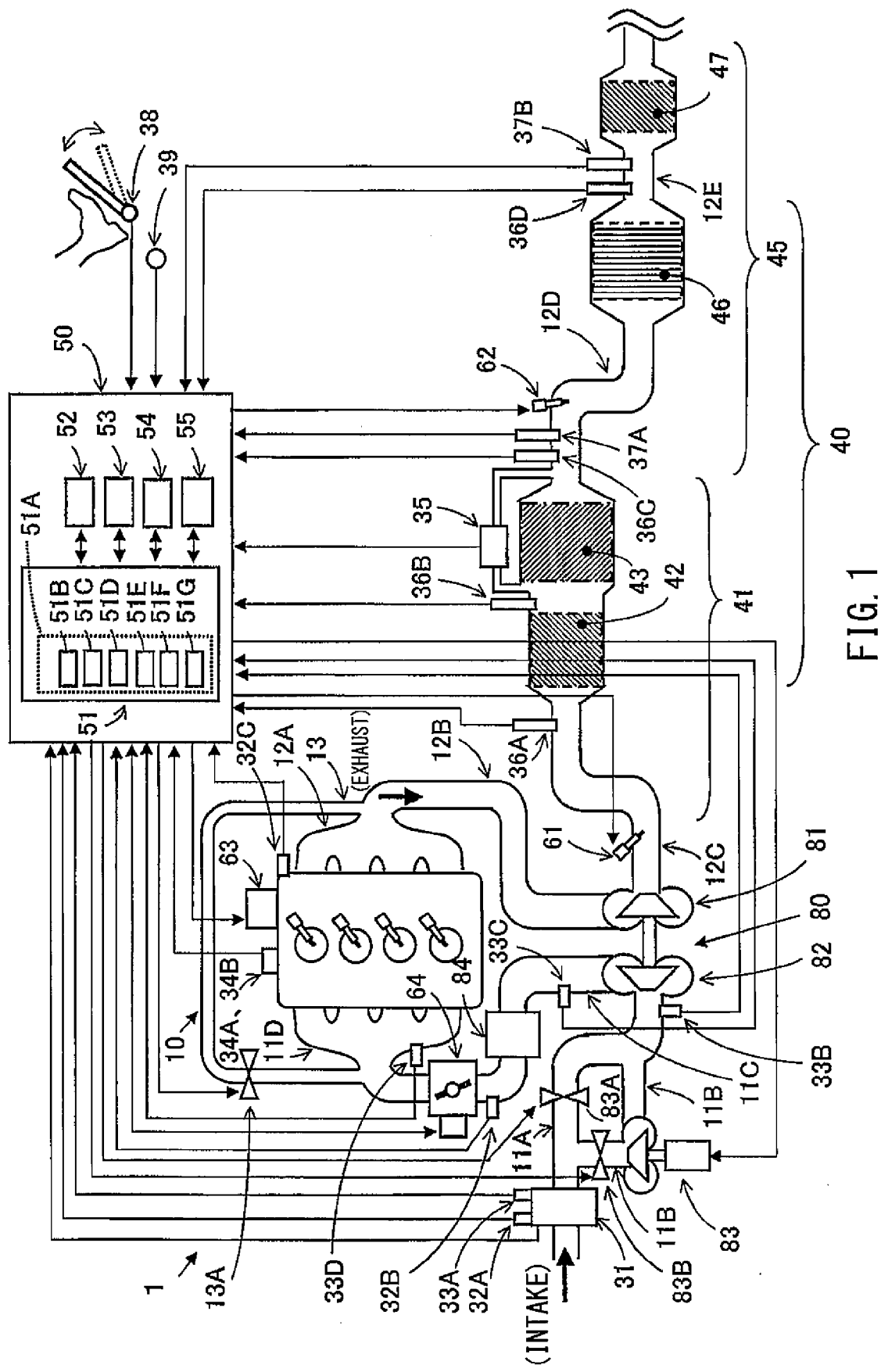
FIG. 1 is a view illustrating an example of an overall structure of an internal combustion engine.

Overall Structure of Internal Combustion Engine System 1 (FIG. 1)

Hereinafter, a control unit 50 for an internal combustion engine system 1 of the present embodiment will be described with reference to drawings. First, FIG. 1 is used to describe an example of an overall structure of the internal combustion engine system 1 according to the present embodiment. An internal combustion engine 10 of the internal combustion engine system 1 of an example shown in FIG. 1 is a diesel engine. Hereinafter, the structure, etc. of the internal combustion engine system 1 will be described in order from an intake side to an exhaust side.

An intake pipe 11A is provided with an air flow rate detector 31. The air flow rate detector 31 may, for example, be an intake air flow rate sensor that is configured to output detected signals to the control unit 50 in accordance with the flow rate of the intake air into the internal combustion engine 10. Further, the air flow rate detector 31 is provided with an intake air temperature detector 32A and an atmospheric air pressure detector 33A. The intake air temperature detector 32A may, for example, be an intake air temperature sensor that is configured to output detected signals to the control unit 50 in accordance with the temperature of the intake air (in this case, ambient air). The atmospheric air pressure detector 33A, may, for example, be a pressure sensor that is configured to output detected signals to the control unit 50 in accordance with the atmospheric pressure. Further, the intake pipe A is connected to a compressor 82 of a turbocharger 80.

Further, a branched intake pipe 11B is connected to the intake pipe 11A. The branched intake pipe 11B is provided with an electric turbocharger 83. The intake pipe 11A is provided with a switching valve 83A, while the branched intake pipe 11B is provided with a different switching valve 83B. The control unit 50 closes the switching valve 83A of the intake pipe 11A and opens the switching valve 83B of the branched intake pipe 11B when driving the electric turbocharger 83. The switching valve 83A of the intake pipe 11A is opened and the switching valve 83B of the branched intake pipe 11B is closed when the electric turbocharger 83 is stopped. When the electric turbocharger 83 is driven, the electric turbocharger 83 feeds supercharged air under pressure toward the compressor 82 of the turbocharger 80.

The intake pipe 11A is connected to an inlet side of the compressor 82 of the turbocharger 80. Another intake pipe 11C is connected to an outlet side of the compressor 82. The compressor 82 is rotated by a turbine 81, which is driven by the exhaust gas. The compressor 82 feeds the intake air incoming from the inlet side intake pipe 11A under pressure to the outlet side intake pipe 11C. A pressure detector 33B is provided to the intake pipe 11A located at an upstream side of the compressor 82. The pressure detector 33B outputs detected signals to the control unit 50 in accordance with the pressure of the air before being compressed by the compressor 82.

A downstream side of the intake pipe 11C is connected to an intake manifold 11D. A pressure detector 33C, an intercooler 84, a throttle device 64, and an intake air temperature detector 32B are provided at the intake pipe 11C. The pressure detector 33c may, for example, be a pressure sensor, that is configured to output detected signals to the control unit 50 in accordance with the pressure of the intake air fed under pressure by the compressor 82. Further, the intercooler 84 lowers the temperature of the intake air fed from the compressor 82 under pressure to increase its oxygen density. The throttle device 64 adjusts an opening degree of a throttle valve to a target throttle opening degree based on control signals from the control unit 50. The intake air temperature detector 32B may, for example, be an intake air temperature sensor that outputs detected signals to the control unit 50 in accordance with the temperature of the intake air lowered by the intercooler 84.

A downstream side of the intake air manifold 11D is connected to an intake port to guide the intake air to respective cylinders of the internal combustion engine 10. The intake air guided to the intake manifold 11D is sucked into the respective cylinders of the internal combustion engine 10 and is used for combustion with the fuel injected from an injector.

The internal combustion engine 10 is provided with a rotation detector 34A and a cylinder detector 34B. The rotation detector 34 may, for example, be a rotation sensor of a crankshaft that is configured to output detected signals to the control unit 50 in accordance with a rotation angle of the crankshaft of the internal combustion engine 10. The cylinder detector 34B may, for example, be a rotation sensor of the camshaft that is configured to output detected signals to the control unit 50 at the timing when a piston for a first cylinder reaches a compression top dead center. Further, the internal combustion engine 10 is provided with a load apparatus 63 capable of adjusting the load of the internal combustion engine 10. The load apparatus 63 may, for example, be an alternator configured to change the load of the internal combustion engine 10 based on load control signals (power generation control signals) from the control unit 50.

An accelerator pedal depression amount detector 38 may, for example, be an accelerator pedal depression amount sensor that is configured to output detected signals to the control unit 50 in accordance with the depression amount of the accelerator pedal operated by a driver. An ignition switch 39 is an input device for a user's instruction to start or stop the internal combustion engine. A user operates the ignition switch 39 when starting a stopped internal combustion engine, or when stopping an operating internal combustion engine.

The control unit 50 calculates a required load based on the rotation speed of the internal combustion engine in accordance with detected signals from the rotation detector 34A, and based on the depression amount of the accelerator pedal in accordance with detected signals from the accelerator pedal depression amount detector 38. These signals are used to calculate a fuel amount corresponding to the required load. The control unit 50 then controls an injector at a predetermined timing in accordance with detected signals from the rotation detector 34A and the cylinder detector 34B, and injects a fuel amount corresponding to the required load.

An exhaust manifold 12A is connected to an exhaust port of the internal combustion engine 10. The exhaust gas from the internal combustion engine 10 is guided to the exhaust manifold 12A, an exhaust pipe 12B, and a turbine 81 of the turbocharger 80. The exhaust gas drives a turbine 81 to rotate as it is exhausted to the exhaust pipe 12C. The exhaust gas from the internal combustion engine 10 (in this case, a diesel engine) contains carbon monoxide (CO), hydrocarbons (HC), particulate matter (PM), and nitrogen oxides (NOx).

An inflow side of an EGR pipe 13, which is for returning some portions of the exhaust gas to the intake air, is connected to the exhaust manifold 12A or to the exhaust pipe 12B. An outflow side of the EGR pipe 13 is connected to the intake pipe 11C or the intake manifold 11D. An EGR valve 13A for adjusting an opening degree of the EGR pipe 13 is provided at the EGR pipe 13. The control unit 50 can adjust a flow rate of the EGR gas by adjusting the opening degree of the EGR valve 13A while the internal combustion engine is in operation. Further, the control unit 50 opens the EGR valve 13A while the internal combustion engine 10 is stopped. This allows fresh air fed from the electric turbocharger 83 under pressure to flow through the intake pipe 11A, the branched pipe 11B, the intake pipe 11C, the EGR pipe 13, and the exhaust pipes 12B, 12C, and to an exhaust gas purifier 40.

The exhaust pipe 12B is connected to an outflow side of the exhaust manifold 12A. An inflow side of the turbine 81 of the turbocharger 80 is connected to a downstream side of the exhaust pipe 12B. Another exhaust pipe 12C is connected to an outflow side of the turbine 81, and the exhaust gas purifier 40 is connected to a downstream side of this exhaust pipe 12C.

The exhaust gas purifier 40 is provided at the exhaust pipe on a downstream side (in this case, the downstream side of the exhaust pipe 12B) of a connection between the EGR pipe 13 and the exhaust pipe 12B (or the exhaust manifold 12A). The exhaust gas purifier 40 includes an upstream exhaust gas purifier 41 and a downstream exhaust gas purifier 45 disposed at a downstream side of the upstream exhaust gas purifier 41. From the upstream side, a first oxidation catalyst 42 (DOC: Diesel Oxidation Catalyst) and a particle trap filter 43 (DPF: Diesel Particulate Filter) are provided in an interior of the upstream exhaust gas purifier 41.

The first oxidation catalyst 42 serves to remove carbon monoxide (CO), hydrocarbons (HC), etc. contained in the exhaust gas using oxidation reactions. The particle trap filter 43 (hereinafter, referred to as a "DPF") serves to trap the particulate matter (PM) contained in the exhaust gas. The exhaust gas flows to the downstream side through the particle trap filter 43. In addition, the particle trap filter 43 has a function to remove carbon monoxide (CO) and hydrocarbons (HC) using oxidation reactions.

The exhaust pipe 12C on an upstream side of the first oxidation catalyst 42 (upstream side of the upstream exhaust gas purifier 41) is provided with an addition valve 61, an exhaust gas temperature detector 36A (e.g., an exhaust gas temperature sensor), and the like. The addition valve 61 injects fuel (liquid additive) into the exhaust pipe 12C. The fuel is subjected to an oxidation reaction within the first oxidation catalyst 42 to raise the temperature of the exhaust gas. The hotter exhaust gas burns and incinerates particulate matter trapped by and deposited in the DPF 43, thereby regenerating the DPF 43. Fuel is supplied to the addition valve 61 from a fuel tank (not shown). Further, the exhaust gas temperature detector 36B (e.g., an exhaust gas temperature sensor) is provided on a downstream side of the first oxidation catalyst 42 and at an upper side of the DPF 43).

The exhaust gas temperature detector 36C (e.g., an exhaust gas temperature sensor) is provided on a downstream side of the DPF 43. Further, a differential pressure sensor 35, which is used for detecting the differential pressure (e.g., a difference in pressure) of the exhaust gas pressure between the downstream side of the first oxidation catalyst 42 and the upstream side of the DPF 43 and the exhaust pressure on the downstream side of the DPF 43, is provided within the upstream exhaust gas purifier 41.

The control unit 50 is configured to detect the differential pressure between the upstream side of the DPF 43 and the downstream side of the DPF 43 based on detected signals from the differential pressure sensor 35. An amount of the particulate matter trapped within the DPF 43 can be estimated in accordance with the detected difference in pressure. The control unit 50 then injects fuel (liquid additive) from the addition valve 61 if the estimated amount of deposit exceeds a threshold value. The injected fuel raises the exhaust gas temperature, which in turn burns and incinerates the particulate matter deposited in the DPF 43 to regenerate the DPF 43. At this time, the control unit 50 detects the exhaust gas temperature at each position based on the detected signals from the exhaust gas temperature detectors 36A, 36B, 36C, and allows the fuel (liquid additive) to be injected from the addition valve 61 so as to maintain the desired temperature.

Further, the downstream exhaust gas purifier 45 is provided from the upstream side with an addition valve 62, a selective reduction catalyst 46 (SCR: Selective Catalytic Reduction), a second oxidation catalyst 47, etc. The selective reduction catalyst 46 (hereinafter, referred to as "SCR") is connected to the downstream side of the DPF 43 via an exhaust pipe 12D. The addition valve 62 is disposed in the exhaust pipe 12D, which is on the downstream side of the DPF 43 and on the upstream side of the SCR 46. The addition valve 62 injects urea water (liquid additive) during exhausting gas at predetermined timings. The injected urea water (liquid additive) is scattered, atomized, and diffused within the exhaust pipe 12D and reaches the SCR 46. Further, the urea water is supplied to the addition valve 62 from a urea water tank (not shown). The SCR 46 serves to reduce and purify the nitrogen oxides (NOx) contained in the exhaust gas using ammonia gas generate from the added urea water.

Further, a NOx detector 37A (e.g., a NOx sensor) is provided at the upstream exhaust pipe 12D of the SCR 46. Another NOx detector 37B (e.g. NOx sensor) and an exhaust gas temperature detector 36D (e.g., an exhaust gas temperature sensor) are provided at an exhaust pipe 12E downstream of the SCR 46. The NOx detectors 37A, 37B serve to output detected signals to the control unit 50 in accordance with the NOx concentration in the exhaust gas. The exhaust gas temperature detector 36D serves to output detected signals to the control unit 50 in accordance with the temperature of the exhaust gas. The control unit 50 calculates a NOx purification rate of the SCR 46 based on the detected signals from the NOx detectors 37A, 37B, and the exhaust gas temperature detector 36D. The control unit 50 controls the addition valve 62 based on the calculated NOx purification rate.

The second oxidation catalyst 47 is connected to the downstream side of the SCR 46 via the exhaust gas pipe 12E. The second oxidation catalyst 47 oxidizes and purifies residual ammonia gas from the exhaust gas. The second oxidation catalyst 47 also includes a function to remove carbon monoxide (CO) and hydrocarbons (HC) through oxidation reactions.

The control unit 50 may be a known one, and may include a CPU 51, a RAM 52, a ROM 53, a timer 54, an EEPROM 55, and the like. The CPU 51 may be configured to implement various calculation processes based on various programs or maps stored in the ROM 53. Further, the RAM 52 may be configured to temporarily store calculation results calculated by the CPU and store data input from each of the detectors. The EEPROM 55 may be a non-volatile storage device configured, for example, to store data concerning the internal combustion engine 10 while the internal combustion engine 10 is stopped.

Further, the control unit 50 is capable of detecting operation states of the internal combustion engine 10 based on the input detected signals. The control unit 50 also obtains requests from an operator based on the detected operation states of the internal combustion engine 10, detected signals from the accelerator pedal depression amount detector 38, etc. The control unit 50 outputs control signals to control various actuators, such as an injector for injecting fuel into cylinders, the addition valves 61, 62 for injecting fuel or urea water, the electric turbocharger 83, the EGR valve 13A, etc. The control unit 50 (CPU 51) may include a deterioration prevention controlling part 51A, an exhaust gas purifier temperature acquiring section 51B, a load adjusting section 51C, an operation stop detecting section 51D, an adsorbed hydrocarbon amount acquiring section 51E, an oxygen-free period estimating section 51F, a replacement of fresh air controlling section 51G, etc., details of these will be described later. These sections may be implemented by circuitry or any other suitable structure.

Here, the hydrocarbons (HC) contained in the exhaust gas are adsorbed to the first oxidation catalyst 42 (and the DPF 43, the second oxidation catalyst 47). The temperature of the first oxidation catalyst 42 (and the DPF 43, second oxidation catalyst 47, etc.) may be raised higher than or equal to an activation temperature as the internal combustion engine 10 is warmed up. The hydrocarbons could be subjected to an oxidation reaction with oxygen contained in the exhaust gas. Since the exhaust gas contains oxygen and continuously flows while the internal combustion engine 10 is in operation, the oxygen will typically not run short for running the oxidation reaction. However, the internal combustion engine 10 may be stopped while hydrocarbons (HC) are still adsorbed to the first oxidation catalyst 42 (and the DPF 43, the second oxidation catalyst 47, etc.). In this case, if the temperature is higher than or equal to the activation temperature, the oxidation reaction of the hydrocarbons will proceed using the surrounding oxygen. However, the surrounding oxygen may eventually run out. If the surrounding oxygen runs out, the oxidation reaction of the adsorbed hydrocarbons (HC) will not proceed, such that the hydrogen (H) will instead be desorbed and that carbon will accumulate as a deposit. This accumulation of carbon may lead to an occurrence of so-called coking. As a result, deterioration of the first oxidation catalyst 42 (and the DPF 43, the second oxidation catalyst 47, etc.) will progress further. The control unit 50 described in the present embodiments serves to prevent the occurrence of the coking by executing processes as will be described below. The control unit 50 also serves to prevent deterioration of the exhaust gas purifier 40 (which may include the first oxidation catalyst 42, the DPF 43, the second oxidation catalyst 47, etc.).

Figure 8:
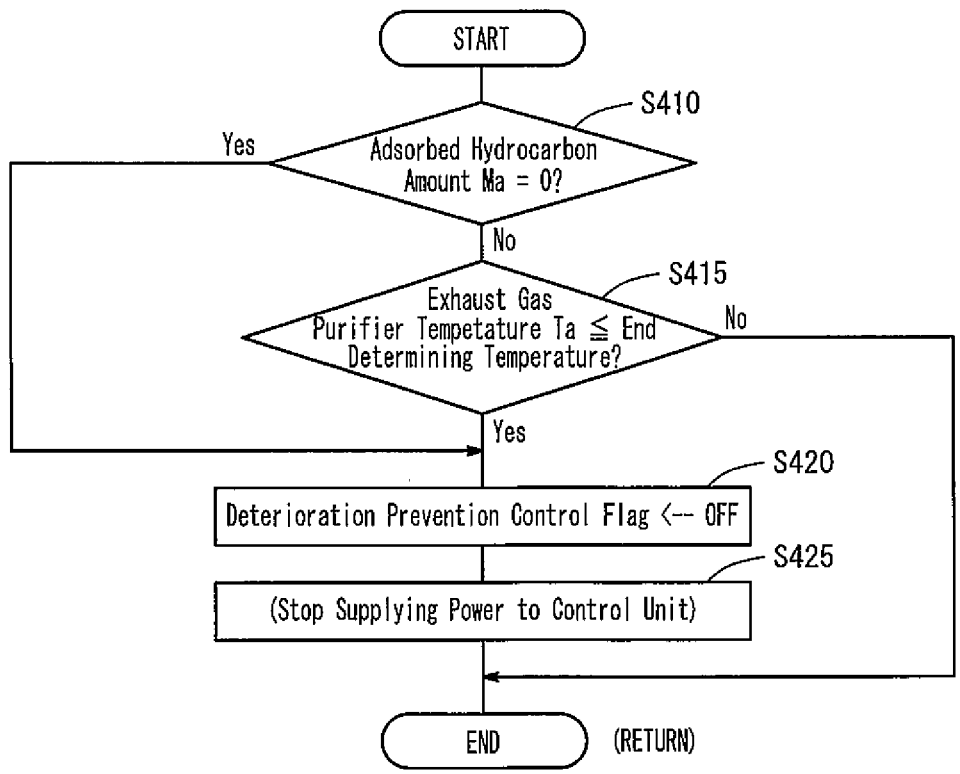
FIG. 8 is a flowchart illustrating details of the process of "Determining End of Deterioration Prevention Control" shown in the flowchart of FIG. 2.
Figure 9:
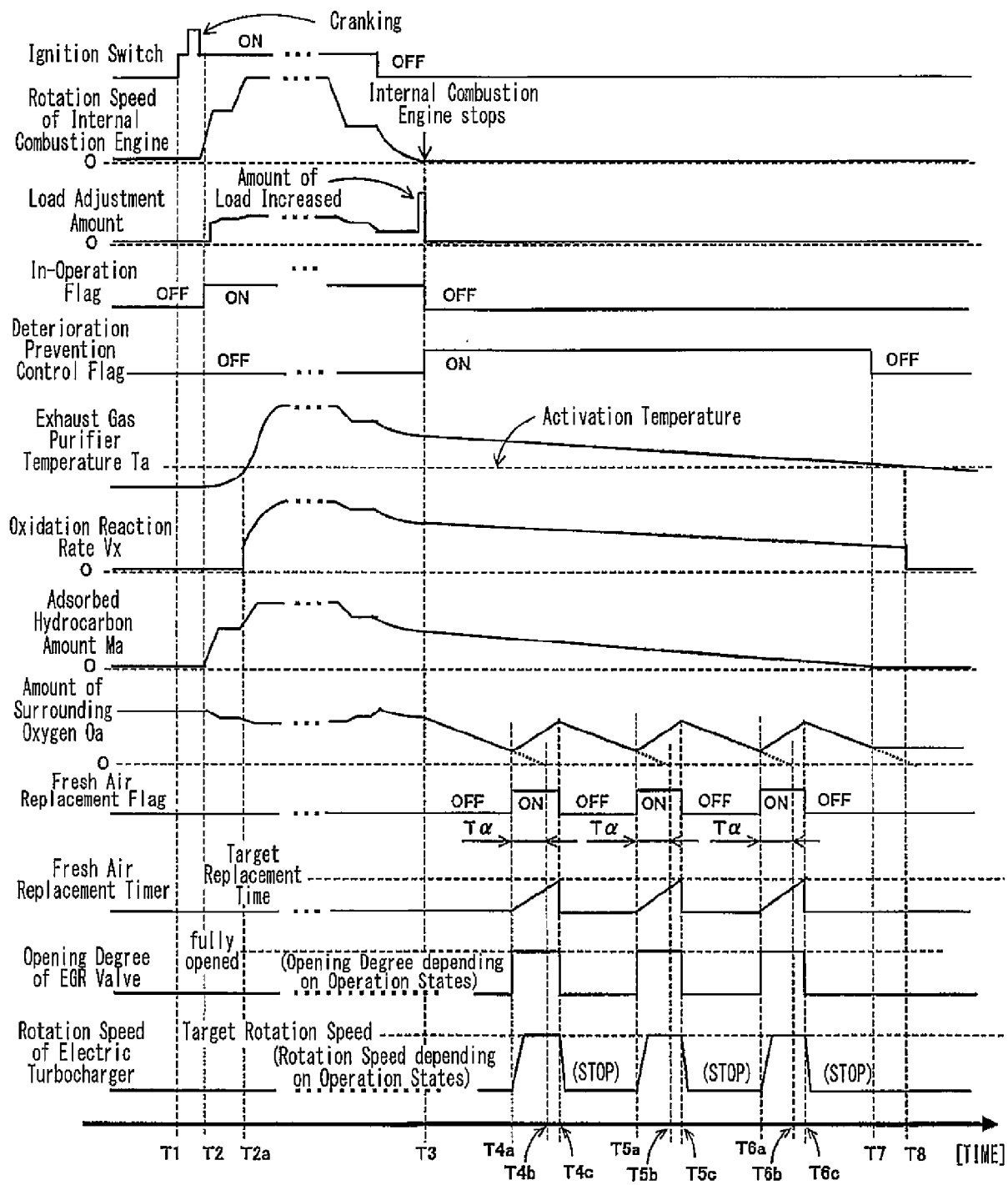
FIG. 9 is an example of operation waves of the deterioration prevention control.

Process Procedures of Control Unit 50 (FIG. 2 to FIG. 8) and Example of Operation Waves (FIG. 9)

Hereinafter, process procedures of the control unit 50 will be described with reference to the flowcharts shown in FIG. 2 to FIG. 8. An example of operation waves will also be described with reference to FIG. 9.

Figure 2:
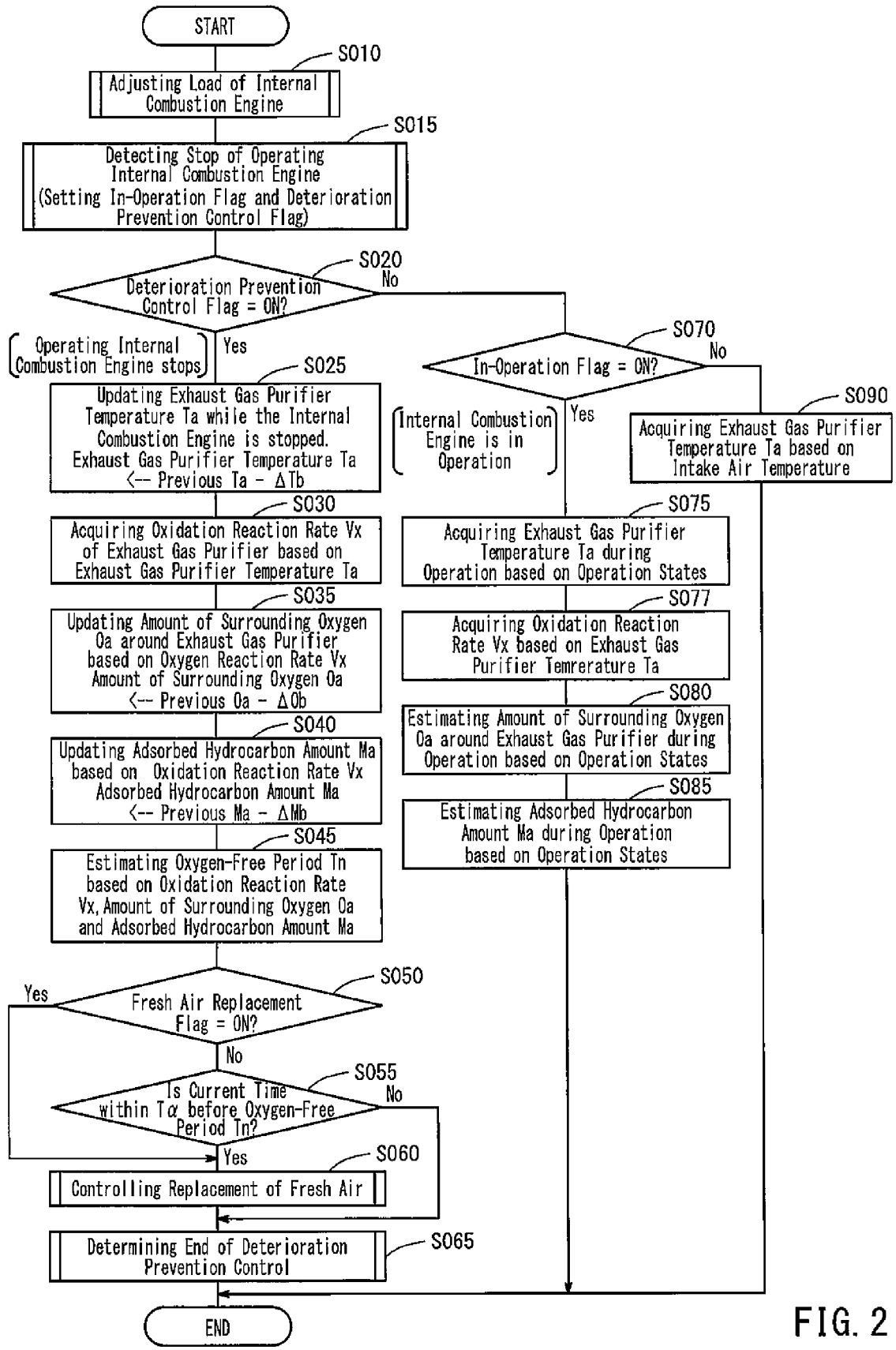
FIG. 2 is a flowchart illustrating an example of an "Entire Processes for Deterioration Prevention Control" for preventing (reducing) occurrence of coking after an operating internal combustion engine has stopped.

Entire Processes for Deterioration Prevention Control (FIG. 2)

The control unit 50 (CPU 51) initiates "Entire Processes of Deterioration Prevention Control" shown in FIG. 2, for example, at predetermined time intervals (several milliseconds to several tens of milliseconds). Upon initiation, the control unit 50 proceeds the process to Step S010. In the following description, an example will be described in which the "first oxidation catalyst" is deemed as the "exhaust gas purifier".

In Step S010, the control unit 50 implements the process of "Adjusting Load of Internal Combustion Engine", and proceeds the process to Step S015. In the process of "Adjusting Load of Internal Combustion Engine", the load existing immediately before stopping the internal combustion engine 10 will be adjusted. More specifically, the internal combustion engine 10 is stopped such that the crank angle is within a range where both the intake and exhaust valves of at least one of the cylinders is open. Details of an embodiment of this process will be described later.

In Step S015, the control unit 50 implements a process of "Detecting Stop of Operating Internal Combustion Engine", and proceeds the process to Step S020. The process of "Detecting Stop of Operating Internal Combustion Engine" is a process to detect that a previously operating internal combustion engine 10 has stopped. The details of an embodiment of this will be described later. In the process of "Detecting Stop of Operating Internal Combustion Engine", an operation flag is set to ON or OFF and a deterioration prevention control flag is set to ON or OFF. The deterioration prevention control flag is the flag which is set to ON when the deterioration prevention control for preventing an occurrence of the above-described coking is started.

In Step S020, the control unit 50 determines whether or not the deterioration prevention control flag is ON. If the deterioration prevention control flag is ON (Yes), the process proceeds to Step S025. If not (No), the process proceeds to Step S070.

When the process proceeds to Step S025, the operating internal combustion engine 10 comes to a full stop The control unit 50 then updates an exhaust gas purifier temperature Ta once the internal combustion engine 10 has stopped and proceeds the process to Step S030. For example, the control unit 50 determines a lowered temperature ΔTb after a certain lapse of time. The previous exhaust gas purifier temperature Ta is updated to the current exhaust gas purifier temperature Ta. The current exhaust gas purifier temperature Ta is obtained by subtracting the lowered temperature ΔTb from the previous exhaust gas purifier temperature Ta. In an example of the operation waves in FIG. 9, the "Deterioration Prevention Control Flag" is set to ON during a period of time from Time T3 to Time T7. The "Exhaust Gas Purifier Temperature Ta" during the time from Time T3 to Time T7 is determined using the process described in Step S025. A method for acquiring exhaust gas purifier temperature Ta while the internal combustion engine 10 is stopped shall not be limited to this method.

Figure 10:
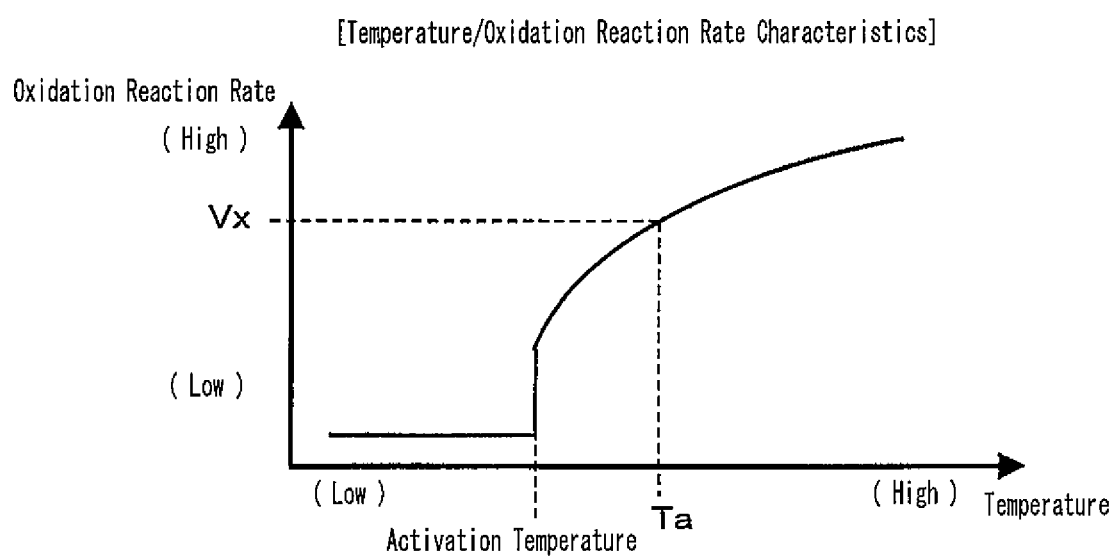
FIG. 10 is a view illustrating an example of temperature/oxidation reaction rate characteristics of the exhaust gas purifier.

In Step S030, the control unit 50 acquires an oxidation reaction rate Vx of the exhaust gas purifier based, for example, on the exhaust gas purifier temperature Ta. The control unit 50 then proceeds the process to Step S035. For example, "Temperature/Oxidation Reaction Rate Characteristics" corresponding to the exhaust gas purifier, an embodiment of which shown in an example of FIG. 10, are stored in a storage device of the control unit 50. The "Temperature/Oxidation Reaction Rate Characteristics" represents the oxidation reaction rate according to the temperature of the target exhaust gas purifier. The example shown in FIG. 10 indicates that the oxidation reaction rate is almost zero below the activation temperature. The control unit 50 acquires the current oxidation reaction rate Vx of the exhaust gas purifier temperature Ta based on the temperature/oxidation reaction rate characteristics and the exhaust gas purifier temperature Ta. In the example of the operation waves in FIG. 9, the "Oxidation Reaction Rate Vx" during the period of time from Time T3 to Time T7, which is when the "Deterioration Prevention Control Flag" is set to ON, is continuously determined using this Step S030.

In Step S035, the control unit 50 updates an amount of surrounding oxygen Oa, which corresponds to the amount of oxygen surround the exhaust gas purifier, based on the oxygen reaction rate Vx. The control unit 50 then proceeds the process to Step S040. For example, the control unit 50 determines a decreased oxygen amount ΔOb in accordance with a lapse of time. The decreased oxygen amount ΔOb is subtracted from the previous amount of surrounding oxygen Oa and the resulting value is used as the current amount of surrounding oxygen Oa. In the example of the operation waves in FIG. 9, the "Deterioration Prevention Control Flag" is set to ON during the period of time from Time T3 to Time T7. During this period of time, a "Fresh Air Replacement Flag" is set to OFF during certain periods of time, from Time T3 to Time T4a, from Time T4c to Time T5a, from Time T5c to Time T6a, and from Time T6c to Time T7. The "Amount of Surrounding Oxygen Oa" during each of these periods of time are determined using Step S035. However, the method for acquiring the amount of surrounding oxygen Oa while the internal combustion engine 10 is stopped shall not be limited to this method.

In Step S040, the control unit 50 updates an adsorbed hydrocarbon amount Ma based on the oxidation reaction rate Vx, and proceeds the process to Step S045. For example, the control unit 50 determines a decreased hydrocarbon amount ΔMb in accordance with a lapse of time. The decreased hydrocarbon amount ΔMb is subtracted from the previous adsorbed hydrocarbon amount Ma and the resulting values is used as a current adsorbed hydrocarbon amount Ma. In the example of the operation waves in FIG. 9, the "Deterioration Prevention Control Flag" is set to ON during a period of time from Time T3 to Time T7. The "Adsorbed Hydrocarbon Amount Ma" during this period of time is determined using Step S040. However, the method for acquiring the adsorbed hydrocarbon amount Ma while the internal combustion engine 10 is stopped shall not be limited to this method.

In Step S045, the control unit 50 estimates when there will be an oxygen-free period Tn. In this embodiment, the oxygen-free period Tn is a period of time in which the surrounding oxygen (amount of surrounding oxygen Oa) will run out. The control unit 50 may estimate when the oxygen-free period Tn will occur based on the current oxidation reaction rate Vx, the current amount of surrounding oxygen Oa, the current adsorbed hydrocarbon amount Ma, etc. The control unit 50 then proceeds the process to Step S050. In the example of the operation waves in FIG. 9, an oxygen-free period T4b will be estimated to occur when, for example, the current time has passed Time T3 before Time T4a.

In Step S050, the control unit 50 determines whether or not the fresh air replacement flag is ON. If the fresh air replacement flag is ON (Yes), the process proceeds to Step S060, and if not (No), the process proceeds to Step S055. The fresh air replacement flag is a flag which is set to ON or OFF during Step S060. When the fresh air replacement is implemented in Step S060, the fresh air replacement flag is a flag which is set to ON.

In Step S055, the control unit 50 determines whether or not the current time is within Tα before the start of the oxygen-free period Tn (Time T4b, T5b, T6b). If the current time is within Tα before the oxygen-free period Tn (Time T4b, T5b, T6b) (Yes), the process proceeds to Step S060, and if not (No), the process proceeds to Step S065. In the example of the operation waves shown in FIG. 9, the control unit 50 determines that the current time is within Tα before the oxygen-free period T4b when, for example, the current time is between Time T4a and Time 4b. If the current time is between Time T3 and Time T4a, it will be determined that the system is not within Tα before the oxygen-free period T4b. Values of Tα are set to appropriate values, for example based on various experiments, etc.

When the process proceeds to Step S060, the control unit 50 implements a process of "Controlling Replacement of Fresh Air" and proceeds the process to Step S065. The process of "Controlling Replacement of Fresh Air" allows the EGR valve to be open for a certain period of time while the internal combustion engine 10 is stopped. The electric turbocharger is driven during this period of time to replace the air surrounding the exhaust gas purifier with fresh air. This process will be described in detail later.

When the process proceeds to Step S065, the control unit 50 implements a process of "Determining End of Deterioration Prevention Control", and ends the process shown in FIG. 2. The process of "Determining End of Deterioration Prevention Control" is a process that may be used to set the deterioration prevention control flag to OFF. More specifically, it is a process to be implemented when states where the deterioration prevention control flag, which was set to ON in Step S015, are satisfied. If the states are satisfied, the control unit 50 will set the flag to OFF. This process will be described in detail later.

If the process proceeds to Step S070 (see, FIG. 2), the control unit 50 determines whether or not an in-operation flag is ON. If the in-operation flag is ON (Yes), the process proceeds to Step S075. If not (No), the process proceed to Step S090. The in-operation flag is set to ON in Step S015 when the internal combustion engine is in operation, and is set to OFF when the internal combustion engine has stopped (see "In-Operation Flag" in FIG. 9). Details of the ON/OFF of the in-operation flag will be described later.

When the process proceeds to Step S075, it has been determined that the internal combustion engine 10 is not stopped, but is instead still operating. While the internal combustion engine 10 is operating, the control unit 50 acquires the exhaust gas purifier temperature Ta based on operation states of the internal combustion engine 10. The process then proceeds to Step S077. For example, the control unit 50 may acquire (estimate) the exhaust gas purifier temperature Ta based on the temperature of the exhaust gas detected by the exhaust gas temperature detector 36A, the exhaust gas flow rate estimated from an intake air volume, rotation speed, etc. In the example of the operation waves in FIG. 9, the "In-Operation Flag" is set to ON during the period of time from Time T2 to Time T3. The "Exhaust Gas Purifier Temperature Ta" during this period of time is determined using Step S075, although other methods may instead be used.

In Step S077, the control unit 50 acquires the oxidation reaction rate Vx based on the exhaust gas purifier temperature Ta. The process then proceeds to Step S080. For example, the control unit 50 may acquire the oxidation reaction rate Vx based on the exhaust gas purifier temperature Ta and the "Temperature/Oxidation Reaction Rate Characteristics" shown in FIG. 10, similar to the process of Step S030. In the example of the operation waves in FIG. 9, the "In-Operation Flag" is set to ON during the period of time from Time T2 to Time T3. The "oxidation reaction rate Vx" during this period of time is determined using Step S077, although other methods may instead by used.

In Step S080, the control unit 50 estimates an amount of surrounding oxygen Oa, which is an amount of oxygen surrounding the exhaust gas purifier during operation, based on the operation states of the internal combustion engine. The process then proceeds to Step S085. For example, the control unit 50 may estimate the amount of surrounding oxygen Oa based on the intake air volume, the rotation speed, a fuel injection volume, etc. In the example of the operation waves in FIG. 9, the "In-Operation Flag" is set to ON during the period of time from Time T2 to Time T3. The "Amount of Surrounding Oxygen Oa" during this period of time is determined using Step S080, although other methods may instead be used.

In Step S085, the control unit 50 estimates the adsorbed hydrocarbon amount Ma, which is an amount of hydrocarbons adsorbed to the exhaust gas purifier during operation, based on the operation states of the internal combustion engine. The control unit 50 then ends the process shown in FIG. 2. For example, the control unit 50 estimates the adsorbed hydrocarbon amount Ma based on the intake air volume, the fuel injection volume, the rotation speed, the exhaust gas purifier temperature Ta, etc. In the example of the operation waves in FIG. 9, the "In-Operation Flag" is set to ON during the period of time from Time T2 to Time T3. The "Adsorbed Hydrocarbon Amount Ma" during this period of time is determined using Step S085, although other methods may instead be used.

If the process proceeds to Step S090 (see, FIG. 2), the control unit 50 acquires (estimates) the exhaust gas purifier temperature Ta based on the operation states of the internal combustion engine (in this case, while the engine is stopped). The control unit 50 then ends the process shown in FIG. 2. For example, the control unit 50 determines an ambient air temperature (intake air temperature detected by the intake air temperature detector 32A) and uses this temperature as the exhaust gas purifier temperature Ta.

Figure 3:
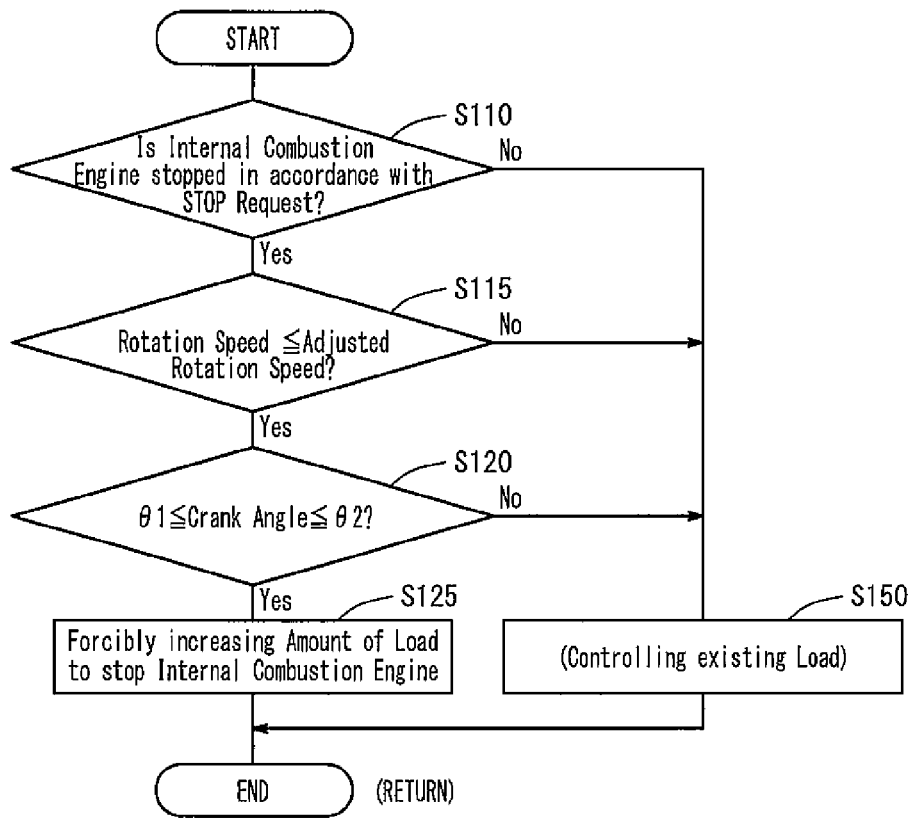
FIG. 3 is a flowchart illustrating details of the process of "Adjusting Load of Internal Combustion Engine" shown in the flowchart of FIG. 2.

Adjusting Load of Internal Combustion Engine (FIG. 3)

A process of "Adjusting Load of Internal Combustion Engine" of Step S010 of FIG. 2 will be described in detail with reference to FIG. 3. When implementing the process of Step S010 of the flowchart shown in FIG. 2, the control unit 50 proceeds the process to Step S110, an embodiment of which is shown in FIG. 3.

In Step S110, the control unit 50 determines whether or not the internal combustion engine has stopped. This may be done by determining whether a stop request (operation of an ignition switch) of the internal combustion engine has been issued by a user. If the engine has been determined to have stopped due to the stop request (Yes), the process proceeds to Step S115. If not (No), the process proceeds to Step S150.

If the process proceeds to Step S115, the control unit 50 determines whether or not the rotation speed of the combustion engine is lower than or equal to an adjusted rotation speed (e.g., a speed lower than or equal to the rotation speed immediately before the internal combustion engine comes to a full stop). If the rotation speed is lower than or equal to the adjusted rotation speed (Yes), the process proceeds to Step S120. If not (No), the process proceeds to Step S150.

If the process proceeds to Step S120, the control unit 50 determines whether or not the crank angle is greater than or equal to a first rotation angle θ1 and less than or equal to a second rotation angle θ2. If the crank angle is greater than or equal to the first rotation angle θ1 and less than or equal to the second rotation angle θ2 (Yes), the process proceeds to Step S125. If not (No), the process proceeds to Step S150. For example, a crank angle of greater than or equal to the first rotation angle θ1 and less than or equal to the second rotation angle θ2 is a crank angle where both the intake and exhaust valves of at least one of the cylinders (e.g., the first cylinder) are open. This allows for a passage from an intake port to an exhaust port through at least one of the cylinders, in addition to the passage of the EGR pipe when fresh air is replacing the oxygen deficient air by using the electric turbocharger. As a result, a pressure loss during the replacement of fresh air can be reduced, which in turn improves the efficiency during the replacement of the fresh air.

If the process proceeds to Step S125, the control unit 50 increases the amount of load to the internal combustion engine to immediately stop the internal combustion engine. For example, a "Load Adjustment Amount" is increased immediately before Time T3 in the example of the operation waves in FIG. 9. More specifically, the control unit 50 outputs control signals (signals of increasing amount of power generation) for increasing the amount of load to the load apparatus 63 (alternator) so as to stop the internal combustion engine immediately. The control unit 50 then ends the process shown in FIG. 3, and returns the process to Step S015 shown in FIG. 2.

If the process proceeds to Step S150, the control unit 50 implements the existing control of the load apparatus 63. Since this control is an existing control, details will be omitted. The control unit 50 then ends the process shown in FIG. 3, and returns the process to Step S015 shown in FIG. 2.

Figure 4:
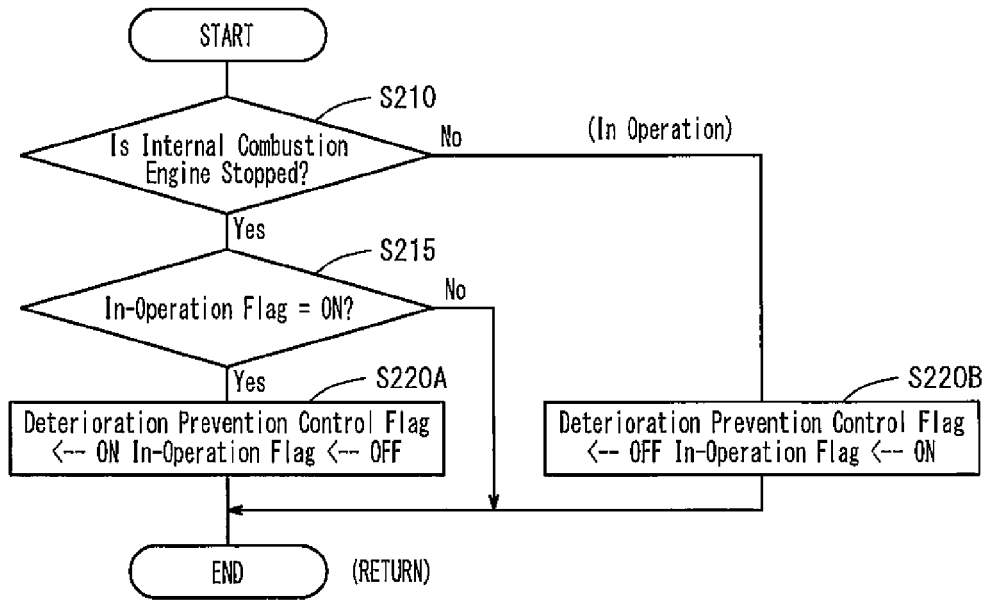
FIG. 4 is a flowchart illustrating details of the process of "Detecting Stop of Operating Internal Combustion Engine" shown in the flowchart of FIG. 2.

Detecting Stop of Operating Internal Combustion Engine (FIG. 4)

A process of "Detecting Stop of Operating Internal Combustion Engine" in Step S015 of FIG. 2 will be described in detail with reference to FIG. 4. When implementing the process of Step S015 of the flowchart shown in FIG. 2, the control unit 50 proceeds the process to Step S210 shown in FIG. 4.

In Step S210, the control unit 50 determines whether or not the internal combustion engine has stopped. If the internal combustion engine has stopped (Yes), the control unit 50 proceeds the process to Step S215. If not (No), the process proceeds to Step S220B.

If the process proceeds to Step S215, the control unit 50 determines whether or not the in-operation flag was previously set to ON. If the in-operation flag was set to ON (Yes), the process proceeds to Step S220A. If not (No), the control unit 50 ends the process shown in FIG. 4, and returns the process to Step S020 shown in FIG. 2.

If the process proceeds to Step S220A, the control unit 50 sets the deterioration prevention control flag to ON and the in-operation flag to OFF. The control unit 50 then ends the process shown in FIG. 4, and returns the process to Step S020 shown in FIG. 2.

If the process proceeds to Step S220B, the control unit 50 sets the deterioration prevention control flag to OFF, and the in-operation flag to ON. The control unit 50 then ends the process shown in FIG. 4, and returns the process to Step S020 shown in FIG. 2.

Through these processes, as shown in the example of the operation waves in FIG. 9, the "In-Operation Flag" is set to ON while the internal combustion engine 10 is in operation. When the operating internal combustion engine has stopped, the "In-Operation Flag" is switched from ON to OFF. In this case, the "Deterioration Prevention Control Flag" is set to ON.

Figure 5:
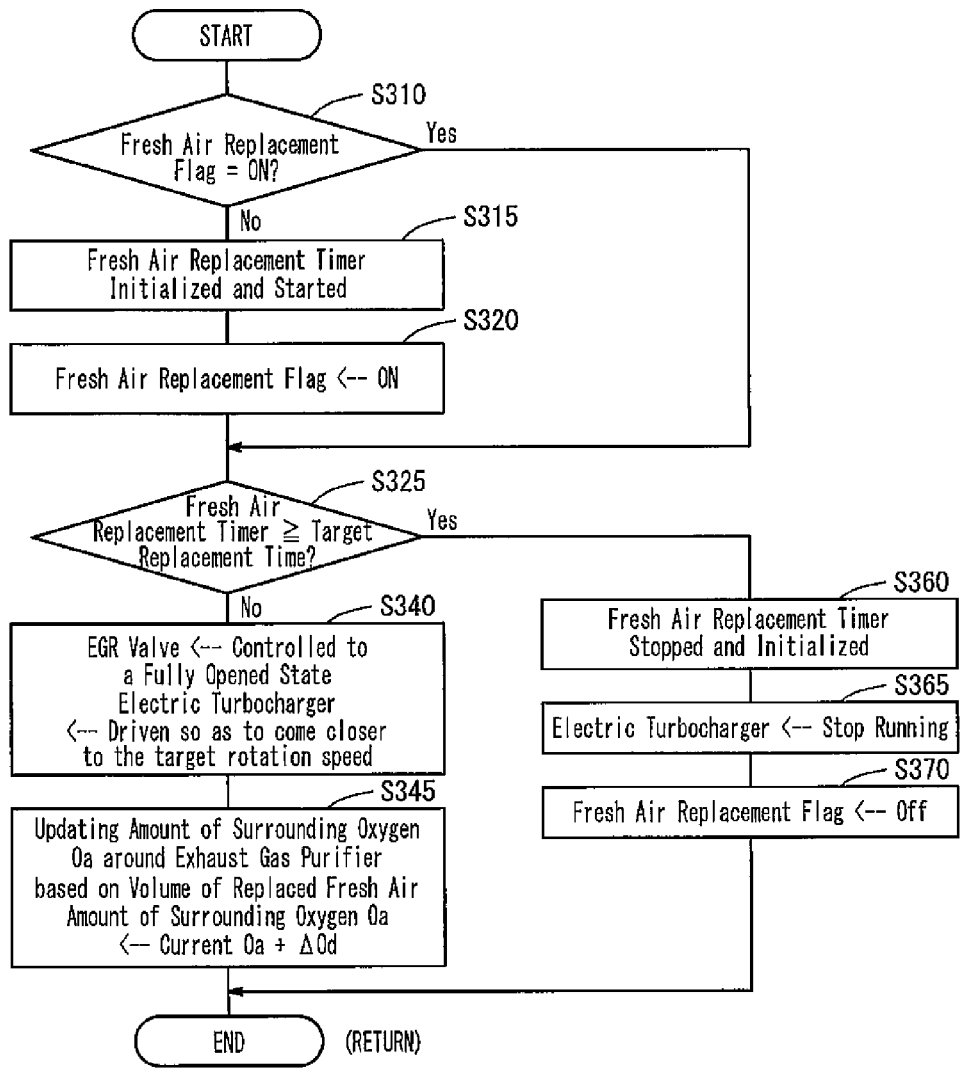
FIG. 5 is a flowchart illustrating details of the process of "Controlling Replacement of Fresh Air" shown in the flowchart of FIG. 2.

Controlling Replacement of Fresh Air (FIG. 5)

Next, a process of "Controlling Replacement of Fresh Air" of Step S060 of FIG. 2 will be described in detail with reference to FIG. 5. When implementing the process of Step S060 of the flowchart shown in FIG. 2, the control unit 50 proceeds the process to Step S310 shown in FIG. 5. In the example of the operation waves in FIG. 9, the "Controlling Replacement of Fresh Air" process is implemented for a period of time starting from Time T4a (or Time T5a, or Time T6a) until the "Fresh Air Replacement Flag" is set to OFF. The fresh air replacement flag is a flag that is set to ON or OFF during the "Controlling Replacement of Fresh Air" process shown in FIG. 4. As will be described below, the fresh air replacement flag is set to ON while the air surrounding the exhaust gas purifier is replaced with fresh air due to the electric turbocharger being driven (which may be done after the operating internal combustion engine has stopped).

In Step S310, the control unit 50 determines whether or not the fresh air replacement flag has been set to ON. If the fresh air replacement flag has been set to ON (Yes), the control unit 50 proceeds the process to Step S325, and if not (No), the control unit 50 proceeds the process to Step S315.

If the process proceeds to Step S315, the control unit 50 initializes and starts a fresh air replacement timer, and then proceeds the process to Step S320.

In Step S320, the control unit 50 sets the fresh air replacement flag to ON and proceeds the process to Step S325.

The "Fresh Air Replacement Flag" is set from OFF to ON in the processes of above Steps S310 to S320, as shown in the example of the operation waves in FIG. 9. In this case, the "Fresh Air Replacement Timer" is initialized and started such that a running time of the electric turbocharger is started to be counted.

When the process proceeds to Step S325, the control unit 50 determines whether or not the time counted by the fresh air replacement timer is longer than or equal to a target replacement time. If the time counted by the fresh air replacement timer is longer than or equal to the target replacement time (Yes), the control unit 50 proceeds the process to Step S360. If not (No), the control unit 50 proceeds the process to Step S340. The "Target Replacement Time" is a time in which the air surrounding the exhaust gas purifier is to be replaced with fresh air while the rotation speed of the electric turbocharger is driven at a "Target Rotation Speed", as will be described later. The "Target Replacement Time" is set to an appropriate value, which may be based on various experiments, etc.

If the process proceeds to Step S340, the control unit 50 controls the EGR valve to be in a fully opened state. Further, the control unit 50 drives the electric turbocharger such that its rotation speed approaches the target rotation speed. The control unit 50 then proceeds the process to Step S345. The "Target Rotation Speed" may be set at a rotation speed of the electric turbocharger with the highest power efficiency.

In Step S345, the control unit 50 determines a volume of the replaced fresh air based on the rotation speed and the running time of the electric turbocharger (for example the time based on the time counted by the fresh air replacement timer). Further, the control unit 50 calculates an amount by which the surrounding oxygen ΔOd increased based on the volume of the replaced fresh air. The control unit 50 then adds this increased amount of oxygen ΔOd to the previous determined amount of surrounding oxygen Oa and then sets this amount as the current amount of surrounding oxygen Oa. The control unit 50 then ends the process shown in FIG. 5, and returns the process to Step S065 shown in FIG. 2. As shown in the example of the operation waves in FIG. 9, the "Fresh Air Replacement Flag" is ON for a period of time from Time T4a to Time T4c, from Time T5a to Time 5c, and from Time T6a to Time T6c. During these periods of time (which correspond to when the electric turbocharger is running), the "Amount of Surrounding Oxygen Oa" is gradually increased due to the increased amount of oxygen ΔOd.

If the process proceeds to Step S360, the control unit 50 stops and initializes the fresh air replacement timer, and proceeds the process to Step S365.

In Step S365, the control unit 50 stops the running of the electric turbocharger, and proceeds the process to Step S370. At this time, the EGR valve does not particularly need to be fully closed, nor does it need to be fully open. Therefore, the EGR valve may not be controlled so as to reduce power consumption.

In Step S370, the control unit 50 sets the fresh air replacement flag to OFF. The control unit 50 then ends the process shown in FIG. 5, and returns the process to Step S065 shown in FIG. 2. In the example of the operation waves in FIG. 9, the "Adsorbed hydrocarbon amount Ma" becomes 0 (zero) at Time T7. Therefore, the "Deterioration Prevention Control Flag" is set to OFF at Time T7.

As described above, and as shown in the example of the operation waves in FIG. 9, in the "Controlling Replacement of Fresh Air" process of FIG. 5, the "Amount of Surrounding Oxygen Oa" increases since the electric turbocharger is driven from Time T4a (or Time T5a, Time T6a). Time T4a is a time prior to the occurrence of the oxygen-free period T4b (or oxygen-free periods T5b, T6b). As a result, oxygen can be added to the system before it is determined that there was be an insufficient amount of oxygen, thereby preventing the occurrence of coking.

In the example of the operation waves in FIG. 9, Time T4a to Time T4c (or Time T5a to Time T5c, or Time T6a to Time T6c), which is a running period of time of the electric turbocharger, may be, for example, about several seconds (e.g., about 1 or 2 second(s)). Time T4c to Time T5a (or from Time T5c to Time 6a), which is the period of time the electric turbocharger is not being driven, may be, for example, about several tens of seconds (e.g., 20 or 30 seconds). Therefore, a power consumption amount can be significantly reduced compared with the case where the electric turbocharger is continuously driven. Since the power consumption amount can be reduced, there is no need to install a large battery. A small battery may be sufficient, which can help reduce the vehicle weight. It is also possible to reduce the amount of power required to drive the internal combustion engine for use for generating power using an alternator. This helps contribute to an improvement in fuel consumption.

As described above and illustrated in the example of the operation waves in FIG. 9, the control unit 50 replaces the fresh air by the fresh air replacement section (by the process of "Controlling Replacement of Fresh Air"). This is done while the oxidation reaction continues in the exhaust gas purifier. In addition, the oxygen-free period estimating section (see Step S045 in FIG. 2) estimates a new oxygen-free period based on the replaced fresh air. These operations can be repeated.

Figure 6:
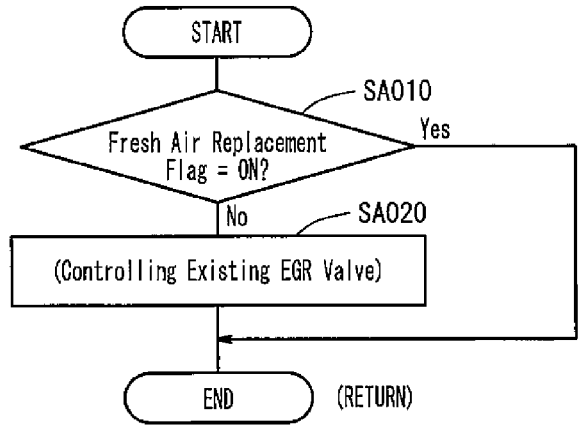
FIG. 6 is a flowchart illustrating processes for "Controlling EGR Valve".

Controlling EGR Valve (FIG. 6)

Hereinafter, a process of "Controlling (Existing) EGR Valve" will be described in detail with reference to FIG. 6. If the "Fresh Air Replacement Flag" is set to ON by "Controlling Replacement of Fresh Air" shown in FIG. 5, this will cause the EGR valve to operate. In this case, the EGR valve is prohibited from operating due to another process, the process for "Controlling (Existing) EGR Valve". The control unit 50 starts the process shown in FIG. 6 at a timing that would typically implement the "Controlling (Existing) EGR Valve", and proceeds the process to Step SA010 shown in FIG. 6.

In Step SA010, the control unit 50 determines whether or not the fresh air replacement flag has been set to ON. If the fresh air replacement flag has been set to ON (Yes), the control unit 50 does not control (drive) the EGR valve, and ends the process shown in FIG. 6. If the fresh air replacement flag has not been set to ON (No), the process proceeds to Step SA020.

When the process proceeds to Step SA020, the control unit 50 controls (drives) the EGR valve based on the previously existing EGR valve control process, and ends the process shown in FIG. 6.

Figure 7:
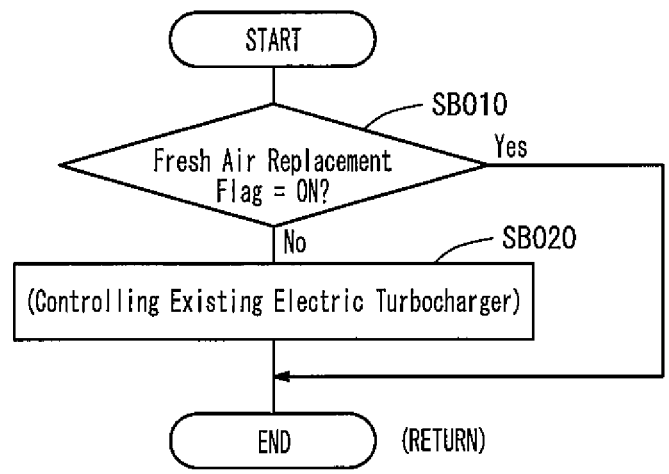
FIG. 7 is a flowchart illustrating processes for "Controlling Electric Turbocharger".

Controlling Electric Turbocharger (FIG. 7)

Hereinafter, a process of "Controlling (Existing) Electric Turbocharger" will be described in detail with reference to FIG. 7. If the "Fresh Air Replacement Flag" is set to ON by "Controlling Replacement of Fresh Air" shown in FIG. 5, the electric turbocharger will be instructed to operate. In this case, the electric turbocharger is prohibited from being operated by other processes, for instance the process for "Controlling (Existing) Electric Turbocharger". The control unit 50 starts the process shown in FIG. 7 at a timing that would typically implement the "Controlling (Existing) Electric Turbocharger", and proceeds the process to Step SB010 shown in FIG. 7.

In Step SB010, the control unit 50 determines whether or not the fresh air replacement flag has been set to ON. If the fresh air replacement flag has been set to ON (Yes), the control unit 50 ends the process shown in FIG. 7, without controlling (driving) the electric turbocharger based on the other process. If the fresh air replacement flag has not been set to ON (No), the process proceeds to Step SB020.

When the process proceeds to Step SB020, the control unit 50 controls (drives) the electric turbocharger based on the other (existing) process, and ends the process shown in FIG. 7.

Determining End of Deterioration Prevention Control (FIG. 8)

Hereinafter, a process of "Determining End of Deterioration Prevention Control" of Step S065 of FIG. 2 will be described in detail with reference to FIG. 8. When implementing the process of Step S065, the control unit 50 proceeds the process to Step S410 shown in FIG. 8. The "Determining End of Deterioration Prevention Control" is a process that may set the deterioration prevention control flag to OFF, which was set to ON in Step S015 shown in FIG. 2.

In Step S410, the control unit 50 determines whether or not the adsorbed hydrocarbon amount Ma is 0 (zero). If the adsorbed hydrocarbon amount Ma is 0 (zero) (Yes), the process proceeds to Step S420 (because the coking would not typically be able to occur). If not (No), the process proceeds to Step S415. Instead of determining whether or not the adsorbed hydrocarbon amount Ma is 0 (zero), the control unit 50 may instead determine whether or not the adsorbed hydrocarbon amount is less than or equal to an acceptable small amount.

If the process proceeds to Step S415, the control unit 50 determines whether or not the exhaust gas purifier temperature Ta is lower or equal to an end determining temperature. If the exhaust gas purifier temperature Ta is lower than or equal to the end determining temperature (Yes), the process proceeds to Step S420 (since the oxidation reaction of the exhaust gas purifier will not progress). If not (No), the control unit 50 ends the process shown in FIG. 8, and returns the process under Step S065 shown in FIG. 2. The "End Determining Temperature" may be, for example, a temperature based on the activation temperature of the exhaust gas purifier, and an appropriate temperature is set.

If the process proceeds to Step S420, the control unit 50 sets the deterioration prevention control flag to OFF. The process for "Deterioration Prevention Control" for preventing the occurrence of the coking after stopping the internal combustion engine ends, and the process proceeds to Step S425.

In Step S425, the process for controlling deterioration prevention after stopping the operating internal combustion engine ends. Therefore, the control unit 50 may stop supplying power to itself. The power supply stop command to the control unit 50 may be implemented by other processes, which may be implemented after the internal combustion engine stops.

In the example of the operation waves in FIG. 9, the control unit 50 determines that the adsorbed hydrocarbon amount=0 (zero) at Time T7, and sets the deterioration prevention control flag to OFF.

The control unit 50 (CPU 51) implementing the processes of Steps S025, S075, and S090 shown in FIG. 2 corresponds to an embodiment of an exhaust gas purifier temperature acquiring section 51B (see FIG. 1) configured to acquire the temperature of the exhaust gas purifier.

The control unit 50 (CPU 51) implementing the process for "Adjusting Load of Internal Combustion Engine" shown in FIG. 3 corresponds to an embodiment of a load adjusting section 51c (see FIG. 1). The load adjusting section 51C is configured to adjust the load existing immediately before the internal combustion engine stops. The internal combustion engine may be stopped such that the crank angle is within a range where both the intake and exhaust valves of at least one of the cylinders are open.

The control unit 50 (CPU 51) configured to implement the process for "Detecting Stop of Operating Internal Combustion Engine" shown in FIG. 4 corresponds to an embodiment of an operation stop detecting section 51D (see FIG. 1). The operation stop detecting section 51D serves to detect whether the operating internal combustion engine has stopped.

The control unit 50 (CPU 51) implementing the processes of Steps S040 and S085 shown in FIG. 2 corresponds to an embodiment of an adsorbed hydrocarbon amount acquiring section 51E (see FIG. 1). The adsorbed hydrocarbon acquiring section 51E estimates the adsorbed hydrocarbon amount Ma, which is an amount of hydrocarbons adsorbed to the exhaust gas purifier while the internal combustion engine is operating or stopped.

The control unit 50 (CPU 51) implementing the process of Step S045 shown in FIG. 2 corresponds to an embodiment of an oxygen-free period estimating section 51F (see FIG. 1). The operation stop detecting section 51D (see FIG. 1) detects that the operating internal combustion engine has stopped. The exhaust gas purifier temperature acquiring section 51B (see FIG. 1) then acquires the exhaust gas purifier temperature Ta once the internal combustion engine has stopped. The oxygen-free period estimating section 51F estimates an oxygen-free period, which is a period during which the oxygen surrounding the exhaust gas purifier for use in the oxidation reaction of the specific components (in this case, hydrocarbons) runs out, based on the exhaust gas purifier temperature Ta.

The control unit 50 (CPU 51) implementing the process for "Controlling Replacement of Fresh Air" corresponds to an embodiment of a replacement of fresh air controlling section 51G (see FIG. 1). The replacement of fresh air controlling section 51G allows the EGR valve to open before the estimated oxygen-free period occurs and drives the electric turbocharger to replace the air surrounding the exhaust gas purifier with fresh air. After the replacement with fresh air has been completed, the electric turbocharges will be instructed to stop running.

As shown in FIG. 1, the deterioration prevention controlling part 51A (see FIG. 1) includes the exhaust gas purifier temperature acquiring section 51B, the load adjusting section 51C, the operation stop detecting section 51D, the adsorbed hydrocarbon amount acquiring section 51E, the oxygen-free period estimating section 51F, and the replacement of fresh air controlling section 51G.

The control unit 50 of the internal combustion engine system 1 shall not be limited to the structures, shapes, configurations, and process steps that are described in the present embodiments, and various modifications, additions, and deletions are possible without departing from the subject matter of the present invention.

The present embodiments include a (first) oxidation catalyst as an exhaust gas purifier. The oxidation catalyst adsorbs specific components (e.g., hydrocarbons) in the exhaust gas. The adsorbed specific components are subjected to oxidation reactions using surrounding oxygen, which can in turn purify these specific components. The exhaust gas purifier shall not be limited to the above-described oxidation catalyst. For example, the exhaust gas purifier may be a DPF (particle trap filter), an NSR (NOx Storage-Reduction Catalyst), a three-way catalyst, a (second) oxidation catalyst, or the like. The exhaust gas purifier may have a function to purify predetermined adsorbed components (e.g., hydrocarbons) by oxidation reactions using surrounding oxygen. Further, the present embodiments shall not be limited to diesel engines, but may be applied to various other internal combustion engines having an exhaust gas purifier. For example, it may be applied to gasoline engines or natural gas engines. The exhaust gas purifier may also have a function to purify adsorbed specific components (e.g., hydrocarbons) by oxidation reactions using surrounding oxygen.

In the above-described embodiments, with regard to the "Adjusting Load of Internal Combustion Engine" process, a process is performed to stop the internal combustion engine at a crank angle where both the intake and exhaust valves of at least one of the cylinders are open. This process may be omitted.

In the above-described embodiments, with regard to the "Determining End of Deterioration Prevention Control" process, an end of deterioration prevention control was determined based on the adsorbed hydrocarbon amount Ma and the exhaust gas purifier temperature Ta. Alternatively, an end of deterioration prevention control may be determined based on a lapse of a certain period of time since the deterioration prevention control flag was set to ON, or based on the number of times the electric turbocharger was driven while the deterioration prevention control flag is set to ON.

In the above-described embodiments, in Step S085 shown in FIG. 2, the adsorbed hydrocarbon amount Ma was estimated while the internal combustion engine was in operation. Alternatively, it may be assumed that the maximum about of hydrocarbons were adsorbed in the exhaust gas purifier while the internal combustion engine was in operation.

In the above-described embodiments, in addition to the EGR valve being opened when the electric turbocharger is driven for the replacement of fresh air, both the intake and exhaust valves of at least one of the cylinders are open. Alternatively, the process for "Adjusting Load of Internal Combustion Engine" may be omitted to allow only the EGR valve to be opened regardless of the open/closed state of the cylinders. Further, in a case where the internal combustion engine uses hydraulic pressure to drive the intake and exhaust valves, instead of using a cam to drive the intake and exhaust valves, both the intake and exhaust valves may be open utilizing hydraulic pressure when the electric turbocharger is driven for the replacement of fresh air.

When greater than or equal to ($\geq$), less than or equal to ($\leq$), greater than (>), less than (<), etc. are mentioned, they may or may not include an equal sign. The numerical values that were used for describing the above embodiments are only some examples, and the scope shall not be limited to these numerical values.

The control unit 50 may include at least one programmed electronic processor. The control unit 50 may include at least one memory configured to store instructions or software to be executed by the electronic processor to carry out at least one of the functions of the control unit 50 described herein. For example, in some embodiments, the control unit 50 may be implemented as a microprocessor with a separate memory.

The data stores of the control unit 50 may include a volatile and/or a non-volatile memory. Examples of suitable data stores include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof.

Where the term "processor" or "central processing unit" or "CPU" is used for identifying a unit performing specific functions, it should be understood that, unless otherwise explicitly stated, those functions can be carried out by a single processor or multiple processors arranged in any form, including parallel processors, serial processors, tandem processors, or cloud processing/cloud computing configurations. The software may include, for example, firmware, one or more applications, program data, filters, rules, one or more program modules, and/or other executable instructions. The software includes, for example, firmware, one or more applications, program data, filters, rules, one or more program modules, and other executable instructions.

What is claimed is:

1. An internal combustion engine system, comprising:
    an internal combustion engine;
    an electric turbocharger provided at an intake pipe connected to the internal combustion engine, the electric turbocharger configured to cause intake air in the intake pipe to flow;
    an EGR pipe configured to return a portion of exhaust gas flowing through an exhaust pipe connected to the internal combustion engine to the intake pipe;
    an EGR valve configured to adjust an opening degree of the EGR pipe;
    an exhaust gas purifier provided at the exhaust pipe on a downstream side of a connection between the EGR pipe and the exhaust pipe, the exhaust gas purifier being configured to adsorb specific components contained in exhaust gas and to allow the adsorbed specific components to be subjected to an oxidation reaction using surrounding oxygen; and
    a control unit configured to detect operation states of the internal combustion engine and to control the electric turbocharger and the EGR valve;
    wherein the control unit is implemented by at least one programmed processor further configured to:
        acquire a temperature of the exhaust gas purifier;
        detect whether the operating internal combustion engine has stopped; and
        implement a deterioration prevention step after it has been detected that the operating internal combustion engine has stopped; wherein:
        in the deterioration prevention step:
            the control unit estimates an oxygen-free period based on an acquired temperature of the exhaust gas purifier acquired by the control unit after it has been detected that the internal combustion engine has stopped, the oxygen-free period being a period of time during which oxygen surrounding the exhaust gas purifier is insufficient for the oxidation reaction of the specific components;
            the control unit instructs the EGR valve to open before the estimated oxygen-free period and instructs the electric turbocharger to be driven to replace air surrounding the exhaust gas purifier with fresh air; and
            the control unit stops instructing the electric turbocharger to be driven after replacement with fresh air has been completed.

2. The internal combustion engine system according to claim 1, wherein when the control unit estimates the oxygen-free period, the control unit acquires an oxidation reaction rate of the exhaust gas purifier based on the acquired temperature of the exhaust gas purifier, and estimates the oxygen-free period based on the acquired oxidation reaction rate.

3. The internal combustion engine system according to claim 1, wherein after the control unit stops instructing the electric turbocharger to be driven, the control unit estimates a second oxygen-free period based on the replaced fresh air and again instructs the electric turbocharger to be driven to again replace the air surrounding the exhaust gas purifier with fresh air.

4. The internal combustion engine system according to claim 1, wherein some of the specific components are hydrocarbons, and wherein the control unit estimates an adsorbed hydrocarbon amount, which is an amount of the hydrocarbons adsorbed to the exhaust gas purifier while the internal combustion engine was in operation and/or after the internal combustion engine was detected as having been stopped, and
    after detecting that the internal combustion engine has stopped, the oxygen-free period is estimated based on the acquired temperature of the exhaust gas purifier and the adsorbed hydrocarbon amount.

5. The internal combustion engine system according to claim 4, wherein while the fresh air is replaced after detecting that the internal combustion engine is stopped, the control unit ends to implement the deterioration prevention step when the control unit determined that the adsorbed hydrocarbon amount is below a threshold.

6. The internal combustion engine system according to claim 1, wherein while the fresh air is replaced after detecting that the internal combustion engine is stopped, the control unit ends to implement the deterioration prevention step when the control unit determined that the acquired temperature of the exhaust gas purifier is lower than or equal to an end determining temperature.

7. The internal combustion engine system according to claim 1, wherein while the operating internal combustion engine is to be stopped, the control unit sends a signal to stop the internal combustion engine such that a crank angle of the internal combustion engine is within a range where both an intake valve and an exhaust valve of at least one cylinder of the internal combustion engine are open.

8. An internal combustion engine system, comprising:
    an internal combustion engine;
    an exhaust pipe through which exhaust gas from the internal combustion engine flows;
    an electric turbocharger configured to cause fresh air to flow through the exhaust pipe;
    an exhaust gas purifier provided at the exhaust pipe, the exhaust gas purifier being configured to adsorb specific components contained in the exhaust gas and to allow the adsorbed specific components to be subjected to an oxidation reaction using surrounding oxygen; and
    a control unit implemented by at least one programmed processor, the control unit being configured to:
        detect whether the internal combustion engine has stopped operating;
        instruct the electric turbocharger to be driven to supply the fresh air to the exhaust gas purifier within a period of time after detecting that the internal combustion engine has stopped operating;
        wherein the period of time is a period of time before an occurrence of an oxygen-free period, which is a state in which oxygen surrounding the exhaust gas purifier is insufficient for the oxidation reaction of the specific components.

9. The internal combustion engine system according to claim 8, wherein the control unit is further configured to estimate the oxygen-free period of time based on a temperature of the exhaust gas purifier detected.

10. The internal combustion engine system according to claim 8, wherein:
the control unit is further configured to estimate an adsorbed hydrocarbon amount, which is an amount of hydrocarbons adsorbed to the exhaust gas purifier while the internal combustion engine was in operation and/or after the internal combustion engine was detected as having been stopped; and
the control unit is further configured to estimate the oxygen-free period of time based on the amount of hydrocarbons adsorbed to the exhaust gas purifier.

11. The internal combustion engine system according to claim 8, wherein after the control unit stops instructing the electric turbocharger to be driven, the control unit estimates a second oxygen-free period based on the replaced fresh air and again instructs the electric turbocharger to be driven to again replace the air surrounding the exhaust gas purifier with fresh air.

12. The internal combustion engine system according to claim 8, further comprising an EGR pipe connecting the exhaust pipe with an intake pipe upstream of the internal combustion engine, wherein at least a portion of the fresh air passes through the EGR pipe.

13. The internal combustion engine system according to claim 8, wherein at least a portion of the fresh air passes through a cylinder of the internal combustion engine.

14. An internal combustion engine system, comprising:
an internal combustion engine;
an exhaust pipe through which exhaust gas from the internal combustion engine flows;
an electric turbocharger configured to cause fresh air to flow through the exhaust pipe;
an exhaust gas purifier provided at the exhaust pipe, the exhaust gas purifier being configured to adsorb specific components contained in the exhaust gas and to allow the adsorbed specific components to be subjected to an oxidation reaction using surrounding oxygen; and
a control unit implemented by at least one programmed processor, the control unit being configured to:
detect whether the internal combustion engine has stopped operating;
estimate a start time of an oxygen-free period of the exhaust gas purifier, the oxygen-free period being a state in which oxygen surrounding the exhaust gas purifier is insufficient for the oxidation reaction of the specific components; and
instruct the electric turbocharger to start being driven to supply the fresh air to the exhaust gas purifier before the estimated start time of the oxygen-free period.

15. The internal combustion engine system according to claim 14, wherein:
the control unit is further configured to acquire a temperature of the exhaust gas purifier after the control unit has detected that the internal combustion engine has stopped operating; and
the control unit is further configured to estimate the start time of the oxygen-free period of the exhaust gas purifier based on the acquired temperature of the exhaust gas purifier.

16. The internal combustion engine system according to claim 14, wherein:
the control unit is further configured to estimate an adsorbed hydrocarbon amount, which is an amount of hydrocarbons adsorbed to the exhaust gas purifier while the internal combustion engine was in operation and/or after the internal combustion engine was detected as having been stopped; and
the control unit is further configured to estimate the start time of the oxygen-free period based on the amount of hydrocarbons adsorbed to the exhaust gas purifier.

17. The internal combustion engine system according to claim 14, wherein:
the control unit is further configured to estimate a start time of a second oxygen-free period of the exhaust gas purifier, the second oxygen-free period being a state in which oxygen surrounding the exhaust gas purifier supplied by the fresh air is insufficient for the oxidation reaction of the specific components; and
the control unit is further configured to instruct the electric turbocharger to start being driven to supply the fresh air to the exhaust gas purifier before the estimated start time of the second oxygen-free period.

* * * * *